US005686732A

United States Patent [19]

Lumma

[11] Patent Number: 5,686,732

[45] Date of Patent: Nov. 11, 1997

[54] X-RAY APPARATUS COMPRISING A PHOTOCONDUCTOR AND A CHARGING DEVICE

[75] Inventor: Waldemar Lumma, Hamburg, Germany

[73] Assignee: U.S. Philips Corporation, New York, N.Y.

[21] Appl. No.: 623,623

[22] Filed: Mar. 28, 1996

[30] Foreign Application Priority Data

Mar. 28, 1995 [DE] Germany ........................ 195 11 286.5

[51] Int. Cl.[6] ........................ G03G 15/02; G03G 15/054; G01T 1/24

[52] U.S. Cl. ............................ 250/580; 250/325; 378/32

[58] Field of Search .................................... 250/580, 591, 250/324, 325, 326; 378/28, 29, 31, 32

[56] References Cited

U.S. PATENT DOCUMENTS

| | | | |
|---|---|---|---|
| 3,586,908 | 6/1971 | Vosteen | 250/324 X |
| 3,934,141 | 1/1976 | Vargas, Jr. | 250/325 |
| 4,678,317 | 7/1987 | Grossinger | 355/216 |
| 4,800,337 | 1/1989 | Cox et al. | 250/325 X |
| 4,975,935 | 12/1990 | Hillen et al. | 250/580 X |
| 5,093,851 | 3/1992 | Schäfer . | |
| 5,467,378 | 11/1995 | Lumma et al. . | |

FOREIGN PATENT DOCUMENTS

| | | |
|---|---|---|
| 0109722A1 | 5/1984 | European Pat. Off. . |
| 4015113 | 11/1991 | Germany . |
| 4333325 | 4/1995 | Germany . |

*Primary Examiner*—Carolyn E. Fields
*Assistant Examiner*—Edward J. Glick
*Attorney, Agent, or Firm*—Jack D. Slobod

[57] ABSTRACT

An apparatus, including a photoconductor (1) for converting X-rays into a charge pattern, and a controllable charging device (3, 9) for charging the surface of the photoconductor to a defined potential. The service life of the charging device is prolonged in that there is provided a measuring device for measuring the potential on the surface of the photoconductor and for controlling the charging device in dependence on the potential.

7 Claims, 1 Drawing Sheet

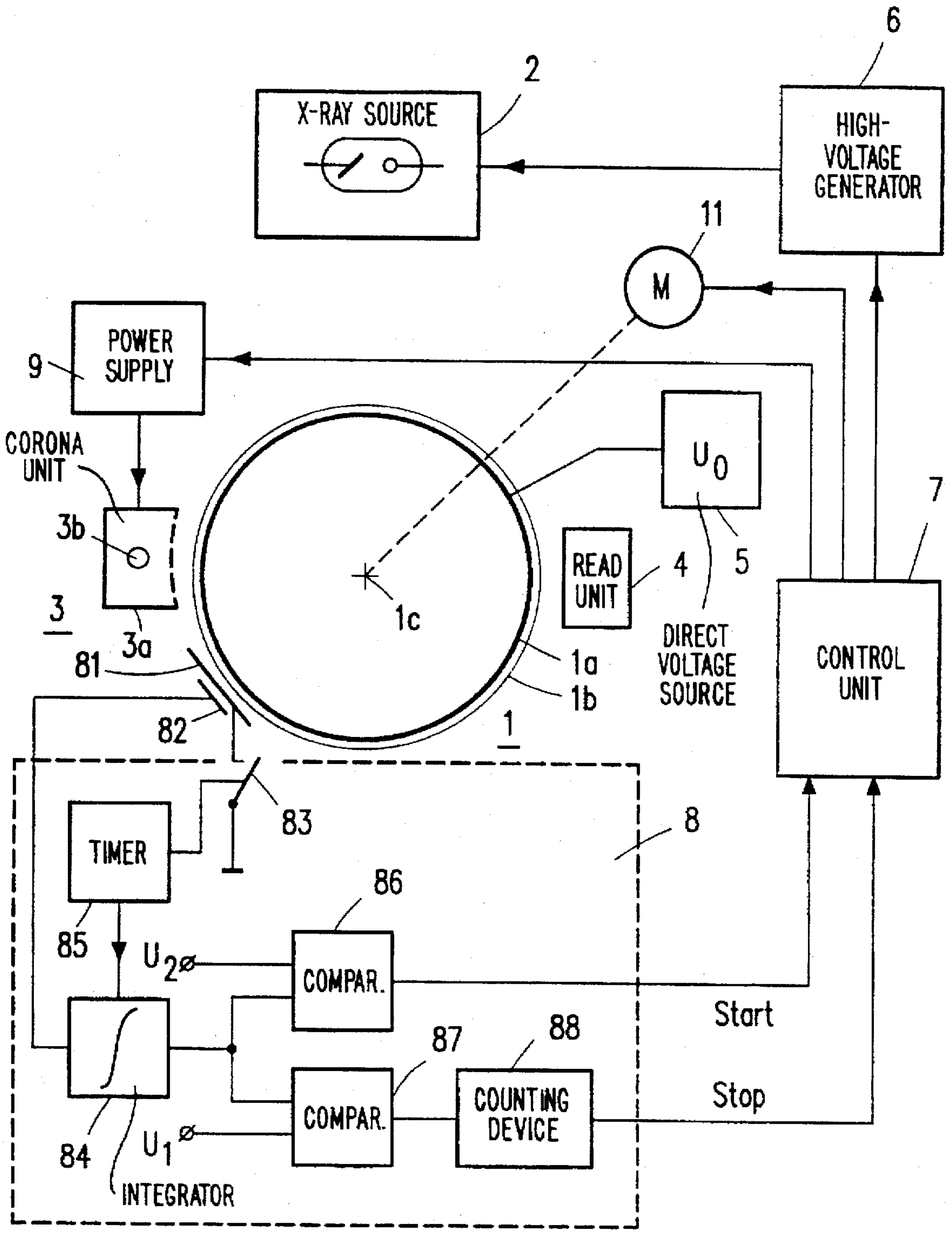
X-RAY SOURCE
2
6
HIGH-VOLTAGE GENERATOR
11
M
POWER SUPPLY
9
CORONA UNIT
3b
3
3a
81
82
U0
5
READ UNIT
4
DIRECT VOLTAGE SOURCE
1c
1a
1b
1
7
CONTROL UNIT
83
8
TIMER
85
86
U2
COMPAR.
Start
87
88
COMPAR.
COUNTING DEVICE
Stop
84
U1
INTEGRATOR

X-RAY APPARATUS COMPRISING A PHOTOCONDUCTOR AND A CHARGING DEVICE

BACKGROUND OF THE INVENTION

1. Field of the Invention

The invention relates to an X-ray apparatus, comprising a photoconductor for converting X-rays into a charge pattern, and a controllable charging device for charging the surface of the photoconductor to a defined potential.

2. Description of the Related Art

An X-ray apparatus of this kind is known from DE-OS 40 15 113 which corresponds U.S. Pat. No. 5,093,851 as well as from DE-OS 43 33 325, which corresponds to U.S. Pat. No. 5,467,378 filed. The photoconductor in an X-ray apparatus of this kind must have been charged to a defined potential before an X-ray image is formed. In a practical X-ray apparatus of this kind, therefore, the controllable charging device is activated so long that the defined potential is reached even in the least favorable circumstances (completely discharged photoconductor, aged charging device). This may require, for example 10 seconds. This means that a time in rental of at least 10 seconds must elapse between two X-ray exposures (after an exposure the charge pattern on the surface must be read before the photoconductor can be charged again for the next exposure). However, for many applications a higher faster exposure rate is required.

In other exposure methods comparatively large idle periods intervals may occur between two successive X-ray exposures. In order to keep the X-ray apparatus continuously ready for operation the charging device remains switched on. This long switch-on period reduces the service life of the charging device. Moreover, the ageing of the charging device is accelerated so that streaky X-ray images may occur.

SUMMARY OF THE INVENTION

It is an object of the present invention to improve an X-ray apparatus of the kind set forth in such a manner that a longer service life and slower aging of the charging device are achieved. This object is achieved in accordance with the invention in that there is provided a measuring device for measuring the potential on the surface of the photoconductor and for controlling the charging device in dependence on the potential.

In accordance with the invention, the charging device is controlled in dependence on the potential measured on the surface of the photoconductor by the measuring device. As a result, the charging device can be switched on for only as long as is necessary to reach the defined potential; a higher X-ray exposure rate can thus be obtained. If the charging device is activated only if the surface of the photoconductor has been discharged by a given amount and if it remains switched on only until the defined potential has been reached again, the operating time of the charging device is substantially reduced, thus reducing the aging effects and prolonging the service life of the charging device. Because ozone is formed during operation of the charging device, the production of ozone is also reduced in proportion to the reduced switch-on time of the charging device.

In the known X-ray apparatus the charge pattern formed on the photoconductor by an X-ray exposure is read by means of probe electrodes which measure the charge on the surface of the photoconductor by influence. It would be possible to use these probe electrodes for measuring the potential if they were triggered not only by the temporal variation of the charge on the surface. In practice this condition is not satisfied. Therefore, additional means must be provided for the measurement. Consequently, in an embodiment of the invention the measuring device comprises a measuring electrode whose charge is determined successively by the potential on the surface of the photoconductor and by the potential of a reference electrode. The charge on the measuring electrode then changes in conformity with the respective active potential, thus causing shift currents which are a measure of the potential to be measured.

In order to ensure continuous measurement, in a further embodiment of the invention the measuring device measures the potential on the surface of the photoconductor during successive measuring cycles, the charge on the measuring electrode during a measuring cycle being determined successively by the potential on the surface of the photoconductor and by the potential of the reference electrode. It would in principle be possible to reciprocate the measuring electrode between the photoconductor and the reference electrode, so that the charge on the measuring electrode is determined alternately by the potential on the photoconductor and that on the reference electrode. However, such a mechanical movement is complex, susceptible to disturbances and inaccuracy. A simpler construction is obtained by arranging the reference electrode between the photoconductor and the measuring electrode and by alternately connecting it to a reference potential via a switching device.

In a further embodiment of the invention, the photoconductor comprises a photoconductor layer which is provided on the circumference of a carrier which rotates during charging, the switching device being controlled so that it connects the reference electrode to the reference potential n times during each revolution of the carrier, n being larger than 1 and preferably not an integer. This embodiment enhances the measuring accuracy notably if subsequent to an X-ray exposure parts of the photoconductor surface have been discharged and other parts have not been discharged. The surface of the photoconductor is then subdivided into a plurality of sectors whose potential is successively measured. If the number n is not integer, it is also achieved that upon further rotation the sectors are situated in a different location position on the photoconductor.

In a further embodiment of the invention, the measuring device comprises an integrator circuit for generating an output signal which corresponds to the time integral of the current flowing across the measuring electrode, said output signal being applied to a comparator device in which it is compared with a reference comparison value which corresponds to the potential on the surface of the photoconductor at which renewed charging takes place. The output signal of the comparator device can then be used for switching on the charging device.

In another embodiment of the invention the measuring device comprises an integrator circuit for generating an output signal which corresponds to the time integral of the current flowing across the measuring electrode, said the output signal being applied to a comparator device in which it is compared with a reference value which corresponds to the potential on the surface of the photoconductor in the fully charged state of the photoconductor. The output signal of the comparator device can then be used for switching off the charging device. The reference values for switching the charging device on and off should deviate from one another, so that recharging of the photoconductor is initiated only after a given discharge.

Subsequent to an X-ray exposure, the part of the photoconductor which has been exposed to the X-rays has been more or less discharged, whereas the potential on the remainder of the photoconductor has remained substantially the same. It must then be ensured that the charging device is not switched off when the measuring electrode detects a part of the photoconductor which has not been affected by the X-ray exposure. In an X-ray apparatus comprising means for displacing the measuring electrode and the photoconductor relative to one another so that the measuring electrode will have measured the surface potential of the photoconductor once after n measuring cycles (where n>1), this can be achieved by providing a counting device for determining the number of successive measuring cycles in which the reference value is reached, and in that after m such cycles the charging device is switched off, m being larger than n. It is only after the reference value has been reached in m successive measuring cycles, corresponding to complete charging of the photoconductor, that it can be assumed that the photoconductor has been uniformly charged, after the charging device is switched off.

BRIEF DESCRIPTION OF THE DRAWING

The invention will be described in detail hereinafter with reference to the drawing. The sole figure of drawing shows diagrammatically a part of the X-ray apparatus in accordance with the invention.

DESCRIPTION OF THE PREFERRED EMBODIMENTS

Referring to the sole figure of the drawing, the reference numeral 1 denotes a photoconductor device which comprises a cylindrical or drum-shaped carrier body 1*a* of aluminum, on the outer surface of which there is provided a photoconductor layer, for example a selenium layer having a thickness of 0.5 nm. The carrier body 1 is connected to a direct voltage source 5 which supplies a negative direct voltage of, for example −1.5 kV relative to ground potential.

The photoconductor is accommodated in a housing (not shown) which shields the photoconductor in a light-tight manner but which is transparent to X-rays at least on its upper side, so that the photoconductor can be exposed by means of an X-ray source 2. Prior to an X-ray exposure, the surface of the photoconductor layer 1*b* is simultaneously charged to a defined potential, for example 0 V, by a charging device 3,9. A motor 11 ensures that the carrier body 1*a* rotates about its longitudinal axis 1*c* during the charging, so that uniform charging is obtained. An X-ray exposure influences the electrical conductivity of the layer 1*b* in dependence on the intensity of the X-rays so that thereon a charge pattern is formed which corresponds to the relevant X-ray image. After the X-ray exposure, the charge pattern thus formed is converted into electric signals by means of a read unit 4, which electric signals are processed so as to form a digital X-ray image as described in detail in DE-OS 40 15 113.

The charging device comprises a corona unit 3 and a controllable direct voltage generator or power supply a which delivers a direct voltage for the corona unit 3. The corona unit 3 extends perpendicularly to the plane of drawing, parallel to the surface of the photoconductor 1 and over the entire length thereof. It comprises a grounded housing 3*a* which has a U-shaped cross-section with an open side facing the photoconductor. The housing 3*a* accommodates a wire 3*b*; preferably, a grid which is also ground is provided between said wire and the photoconductor. During a charging operation, the wire 3*b* is connected to a positive voltage of, for example 4 kV. As a result, a substantially inhomogeneous electric field arises around the wire, which field causes a gas discharge. During the gas discharge, the air molecules in the vicinity of the wire 3*b* are ionized. The positive charge carriers thus generated reach the surface of the photoconductor 1, through the meshes of said grid, and charge this surface. When the surface reaches the potential of the grounded housing 3*a*, substantially no further charge carriers will reach the photoconductor, but only the housing 3*a* or said grid.

The discharging operations electrically charge dust particles in the vicinity of the wire. The negatively charged dust particles collect on the one wire 3*b*. This dust deposit reduces the number of charge carriers generated per unit of time, so that complete charging of the photoconductor surface will require more time. This aging effect becomes more pronounced in the course of time until ultimately the corona unit 3 becomes useless and must be replaced. Generally speaking, the deposition of dust on the wire 3*b* is non-uniform, thus causing stripe-like artefacts in the X-ray image. Furthermore, the discharging operations produce ozone which reacts with the corona charging device and other parts of the X-ray apparatus, thus causing corrosion. It follows from the foregoing that the described negative effects are more pronounced as the discharging operation in the corona unit 3 are longer.

In accordance with the invention, the potential on the surface of the photoconductor 1 is continuously measured and the power supply 9 is controlled, in dependence on the potential, in such a manner that the duration of discharging is minimized, but the X-ray apparatus nevertheless always remains ready for exposures, that is to say even faster than thus far. To this end, there is provided a measuring device 8 whose output signals are applied to a control unit 7 which may comprise, for example a microprocessor and which controls the power supply 9 as well as the drive motor 11 and the high-voltage generator 6. The measuring device 8 comprises a measuring electrode 82 and a reference electrode 81. The measuring electrode 82 extends in the axial direction (perpendicularly to the plane of drawing) over the entire length of the photoconductor. It is formed by a fiat plate having a width of 4 cm. The plate is arranged relative to the photoconductor in such a manner that a perpendicular plane erected at the center of the plate extends perpendicularly to the photoconductor surface. The reference electrode 81 has the same length as the measuring electrode 82, but its width is slightly larger (5 cm). It extends parallel to the measuring electrode 81 and is arranged between the measuring electrode and the photoconductor, its distance from said components being 1 cm. The reference electrode 81 can be connected to a reference potential, for example ground, via a switch 83.

When the switch 83 is closed, the electric field in the space between the electrodes 82 and 83 is substantially zero, because the potential of the measuring electrode 82 is maintained at ground level via the input of an integrator 84 connected thereto. Consequently, no charge is present on the electrode 82. When the switch 83 is open, the potential of the reference electrode 81 assumes a value corresponding to the potential distribution between the photoconductor 1 and the measuring electrode 82. In that case the reference electrode 81 does not have an effect on the electric field between the photoconductor 1 and the measuring electrode 82. On the measuring electrode 82 a charge density develops which is proportional to the electric field between the measuring electrode 82 and the photoconductor 1, and hence proportional to the potential of the photoconductor. The charge density on the measuring electrode 82, therefore, changes when the switch 83 is opened, so that a shift current occurs. The integrator circuit 84 converts this shift current into a voltage variation on its output, which variation is proportional to the time integral of the shift current.

The potential on the surface of the photoconductor is measured in successive measuring cycles, in each measuring cycle the switch 83 being opened once and closed once, so that the charge density on the measuring electrode is successively determined by the potential on the surface of the photoconductor 1 and by the potential of the reference electrode 81. The measuring cycles are defined by a timer 85 which opens and closes the switch 83 and which resets the integrator circuit 84 when the switch 83 is closed.

The output signal of the integrator circuit is applied to a comparator device which consists of at least two comparators 86 and 87 and which compares this signal with a first reference value $U_1$ and a second reference comparison value $U_2$. The comparators 86 and 87 generate an output pulse when the voltage on the output of the integrator 84 reaches the reference values $U_1$ or $U_2$, respectively. The reference value $U_1$ is reached when the photoconductor 1 has been charged to such an extent that a potential of +1 V occurs on its surface, whereas the value $U_2$ is reached when the photoconductor has been discharged to some extent, for example to a potential of −10 V.

It is assumed that the X-ray apparatus is switched on after a pause lasting one or several days during which the photoconductor has become fully discharged. The procedure is then as follows: the control unit 7 switches on the motor drive 11 and adjusts the direct voltage applied to the corona unit 3 by the power supply 9 to a value (for example, +4 kV) at which a corona or gas discharge occurs. As a result, the surface of the rotating photoconductor is charged, its potential initially corresponding to the value of the voltage supplied by the direct voltage source 5 (−1.5 kV) becoming more positive. As charging progresses, the displacement currents become smaller until the output signal of the integrator circuit 84 reaches the reference value $U_1$ and the comparator 87 generates an output pulse. For reasons yet to be described hereinafter, the output pulses generated by the comparator 87 are counted by a counting device 88. The counting device 88 is constructed so that it generates a (stop) signal when an output pulse has been generated in m successive measuring cycles, i.e. when the surface potential of the photoconductor has reached the defined value in each of said m measuring cycles. The output signal of the counting device 88 is applied to the control unit 7 which switches off the motor drive 11, generates an X-ray exposure enable signal, and switches over the power supply 9 so that the potential of the wire *3b* becomes either 0 V or, for the reasons disclosed in DE-OS 43 33 325, assumes a negative value.

An X-ray exposure can then be initiated, the surface of the photoconductor 1 facing the X-ray source 2 then being discharged more or less. Subsequent to the X-ray exposure, the charge pattern generated on the surface of the photoconductor is read in a known manner by means of the read unit 4. The voltage of the power supply source 9 is then adjusted again to a value (+4 kV) at which a corona discharge takes place, which discharge charges the rotating photoconductor again. Because the photoconductor has been only partly discharged by the preceding X-ray exposure, the recharging of the photoconductor requires substantially less time than required for complete recharging in unfavorable conditions (aged corona unit). The shortest possible period of time between two X-ray exposures is thus reduced and the stop signal is generated after m measuring cycles.

The number m should be at least equal to the quotient n resulting from the switching frequency of the switch 83 and the rotation frequency of the photoconductor (for example, 0.7 Hz) and mounting to, for example 8.5. It is thus ensured that the switch-off command for charging is given only if in m successive measuring cycles all parts of the photoconductor, notably also the parts exposed to X-rays during an X-ray exposure, have been charged to the defined potential. The number n should preferably not be an integer number. It is thus ensured that during successive revolutions of the photoconductor the measuring electrode 82 measures the potential on different segments of the photoconductor.

When the photoconductor has been charged again subsequent to an X-ray exposure, without a further X-ray exposure taking place immediately thereafter, the photoconductor must nevertheless be maintained in a standby state. Therefore, in the known X-ray apparatus the corona unit remains active so that the surface is continuously recharged. In accordance with the invention, however, it is de-activated after each recharging operation (and the drum is stopped) as explained before. However, the surface potential is still measured. When the surface potential drops below a given lower limit value after a few minutes, the output signal of the integrator circuit 84 reaches the reference value $U_2$ and the comparator 86 generates a start pulse which triggers the control unit 7 so as to start the motor drive again and to set the supply source 9 to a voltage at which the corona discharge is activated again. When the surface potential of the photoconductor 1 has reached the defined value, the comparator 87 is activated after which, (at least m-1 measuring cycles later) the motor drive and the charging operation are stopped again. Despite the short switch-on time of the corona unit, the X-ray apparatus can thus be maintained in the operational state for prolonged periods of time. The service life of the corona unit 3 is thus substantially prolonged.

In the above embodiment the recharging operation was started and stopped at different potentials. To this end, the output signal of the integrator was compared with different reference values $U_1$, $U_2$ in the comparator device 86, 87. The same effect, however, could be achieved by connecting the reference electrode 81, via the switch 83, to a reference potential during recharging which is higher than that after charging. The comparator device would then require only one comparator or one reference value.

It has been assumed in the foregoing that the photoconductor is provided on a cylindrical carrier *1a*. The invention however, can also be used when the photoconductor is provided on a carrier having a different shape, for example a plane carrier. In that case appropriate means must be provided for displacing the corona unit relative to the photoconductor. The measuring electrode and the reference electrode should then be coupled to the corona unit.

I claim:

1. An X-ray apparatus, comprising a photoconductor for converting X-rays into a charge pattern, a controllable charging device for charging the surface of the photoconductor to a defined potential by a corona discharge, and a measuring device for measuring the potential on the surface of the photoconductor and for controlling the charging device in dependence on the measured potential in a manner that the corona discharge is stopped when a predetermined potential state is reached on the surface of the photoconductor, wherein the measuring device comprises a measuring electrode and a reference electrode, a charge on the measuring electrode being determined successively by the potential on the surface of the photoconductor and by the potential of the reference electrode.

2. An X-ray apparatus as claimed in claim 1, wherein the measuring device is for measuring the potential on the surface of the photoconductor during successive measuring cycles, the charge on the measuring electrode during a measuring cycle being determined successively by the potential on the surface of the photoconductor and by the potential of the reference electrode.

3. An X-ray apparatus as claimed in claim 2, wherein the reference electrode is arranged between the photoconductor and the measuring electrode and the measuring device comprises a controlled switching device for alternately connecting the reference electrode to a reference potential.

4. An X-ray apparatus as claimed in claim 3, wherein the photoconductor comprises a photoconductor layer which is provided on the circumference of a carrier which rotates during charging, the switching device being controlled so that it connects the reference electrode to the reference potential n times during each revolution of the carrier, n being larger than 1 and not an integer.

5. An X-ray apparatus as claimed in claim 2, wherein the measuring device comprises an integrator circuit for generating an output signal which corresponds to a time integral of a current flowing across the measuring electrode, and a comparator device for comparing said output signal with a reference value which corresponds to a potential on the surface of the photoconductor at which renewed charging takes place.

6. An X-ray apparatus as claimed in claim 2, wherein the measuring device comprises an integrator circuit for generating an output signal which corresponds to a time integral of a current flowing across the measuring electrode, and a comparator device for comparing said output signal with a reference value which corresponds to a potential on the surface of the photoconductor in a fully charged state of the photoconductor.

7. An X-ray apparatus as claimed in claim 6, further comprising means for displacing the measuring electrode and the photoconductor relative to one another so that the measuring electrode will have measured the potential on the surface of the photoconductor once after n measuring cycles, and a counting device for determining a number of successive measuring cycles in which said reference value is reached, and means for switching off the charging device after m such cycles, where m>n.

* * * * *